E. T. & W. E. COX.
STEERING MECHANISM.
APPLICATION FILED MAR. 21, 1917.

1,268,933.

Patented June 11, 1918.
2 SHEETS—SHEET 1.

Inventors
Elmer T. Cox
William E. Cox
By Arthur L. Slee
Atty.

E. T. & W. E. COX.
STEERING MECHANISM.
APPLICATION FILED MAR. 21, 1917.
1,268,933.
Patented June 11, 1918.
2 SHEETS—SHEET 2.
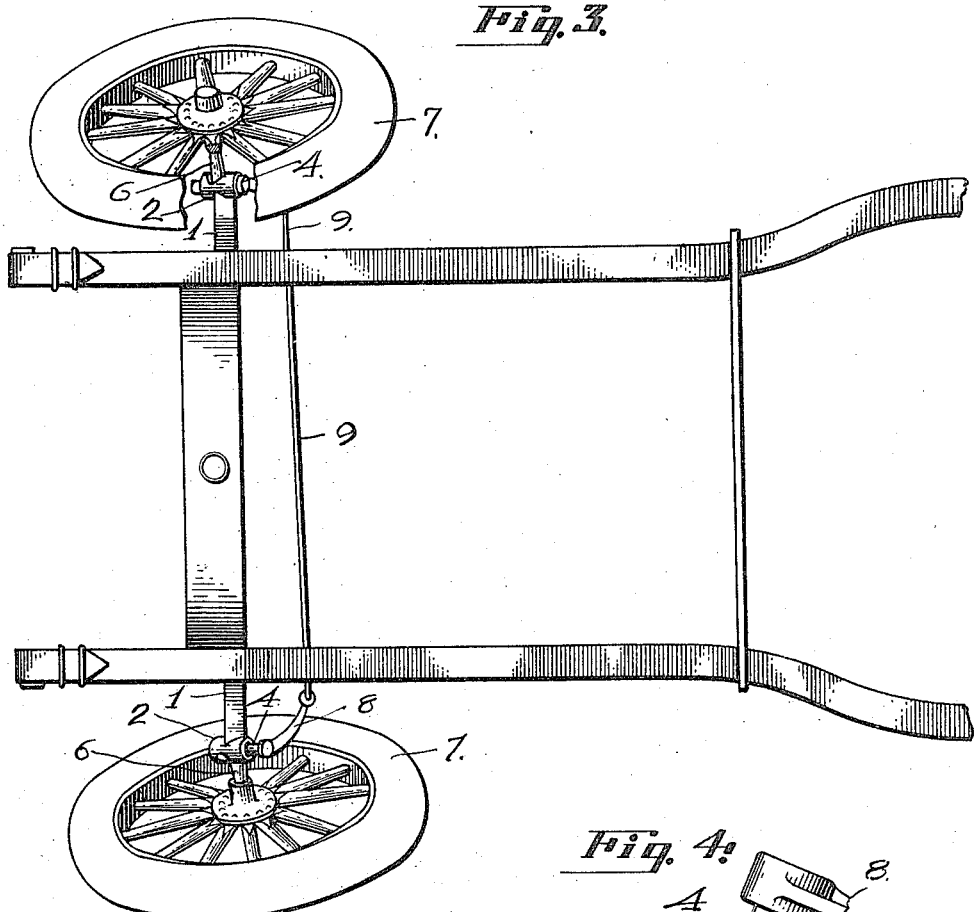
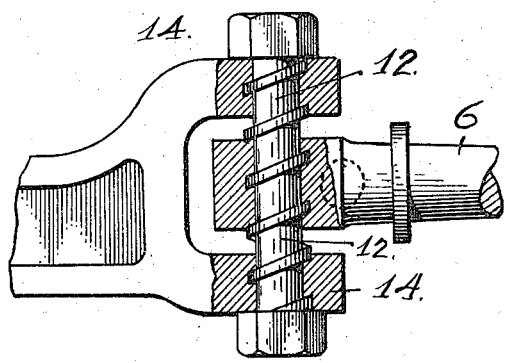
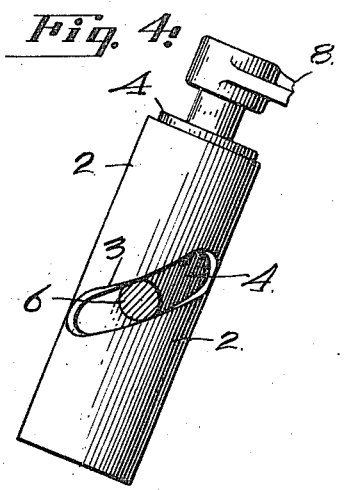
Inventors
Elmer T Cox
William E. Cox
By Arthur L. Slee.
Atty.

UNITED STATES PATENT OFFICE.

ELMER T. COX, OF SAN FRANCISCO, AND WILLIAM E. COX, OF OAKLAND, CALIFORNIA.

STEERING MECHANISM.

1,268,933. Specification of Letters Patent. Patented June 11, 1918.

Application filed March 21, 1917. Serial No. 156,479.

*To all whom it may concern:*

Be it known that we, ELMER T. COX and WILLIAM E. COX, citizens of the United States, residing in the city and county of San Francisco and at Oakland, in the county of Alameda and State of California, respectively, have jointly invented a new and useful Improvement in Steering Mechanisms, of which the following is a specification.

Our invention relates to improvements in steering mechanisms for vehicles and the like wherein rearwardly inclined spindles operate in conjunction with oppositely inclined spiral mechanisms to incline both wheels toward the direction in which they are turned when steering; and the objects of our invention are—

First, to provide an improved steering mechanism adapted to partially offset the lateral thrust occasioned on the front wheels when steering;

Second, to provide an improved steering mechanism adapted to provide greater lateral resistance, when steering, to the front or steering wheels of a vehicle;

Third, to provide an improved device of the character described adapted to retain a constant level or elevation of the front axle of the vehicle while the wheels are inclined.

We accomplish these several objects by means of the device disclosed in the drawings forming a part of the present specification, wherein like characters of reference are used to designate similar parts throughout the said specification and drawings, and in which—

Fig. 3 is a plan view of a chassis of a vehicle disclosing the inclination of the wheels;

Fig. 4 is an enlarged detailed side elevation of one of the inclined sleeves and the spindle mounted therein, the wheel axis being shown in section; and Fig. 5 is a side elevation of a modified form of our invention.

Figure 1:
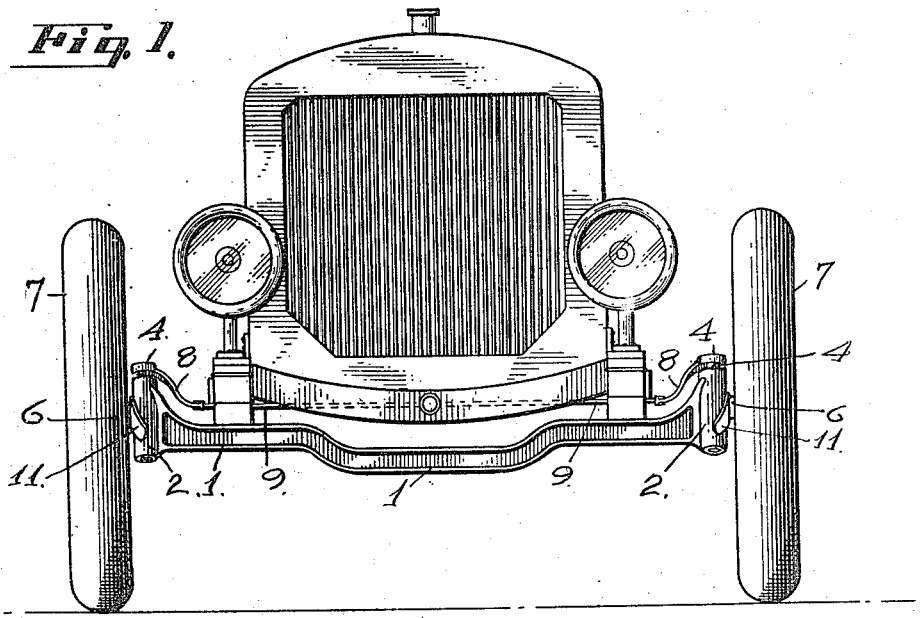
Figure 1 is a front elevation of a vehicle with the wheels in normal position disclosing the arrangement of the improved steering spindles.

Referring to the drawings, the numeral 1 is used to designate a front axle of a vehicle upon each end of which axle 1 is mounted a rearwardly inclined sleeve 2 each sleeve having oppositely inclined spiral slots 3 therein, said spiral slots being of equal pitch.

Within each sleeve 2 is rotatably mounted a spindle 4 having a lateral wheel axle 6 extending therefrom and through the slot 3 within the sleeve 2. A wheel 7 is rotatably mounted upon each axle 6.

Each spindle 4 is provided at the top thereof with a steering arm 8 and a cross connecting rod 9 is connected to the ends of the steering arms 8 whereby the wheels 7 may be turned simultaneously, said connecting rod 9 being in turn operatively connected to suitable steering gear not shown.

Figure 2:
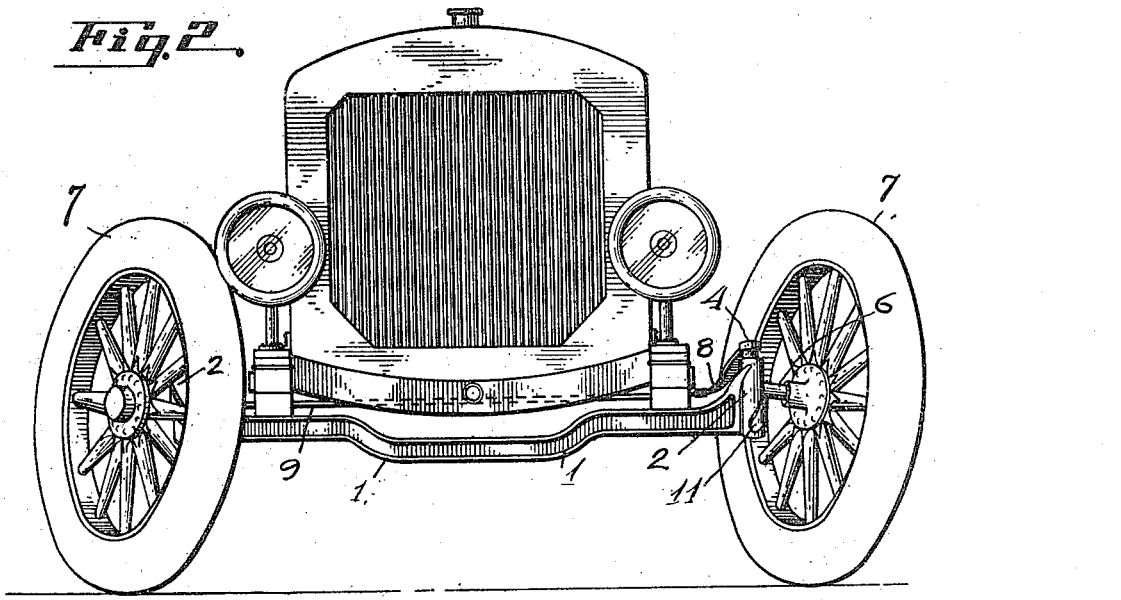
Fig. 2 is a similar view disclosing the manner in which the front wheels are inclined toward the direction in which they are being turned while steering.

Each wheel axle 6 is provided with a spiral shaped guard 11 to prevent the entrance of dust and other foreign matter to the spindle 4 through the slots 3 as disclosed in Figs. 1 and 2 of the drawings.

The operation is as follows:

As the spindles 4 are inclined it is evident that the wheel axles 6 and wheels 7 will also be inclined when said spindles 4 are partially rotated and that the inclination of the wheels 7 will be toward the direction in which they are being turned when steering. That is, as the wheel axles 6 are arranged laterally or perpendicular to the spindles 4 said wheels would assume the same angle of inclination as the spindle 4 when said spindle has been turned through an angle of ninety degrees or a right angle.

This inclination would turn and incline the wheels 7 to resist a forward movement of the vehicle and in a direction which would tend to bring the line of resistance more nearly parallel to the plane of the wheel and thereby partially offset the lateral thrust on the wheels 7. Should the spindle 4 be turned through one-half a right angle or an angle of 45 degrees the direction of the vehicle would be changed and directed toward the direction in which the wheels 7 were turned.

If the slots 3 were not inclined but merely arranged transversely to the spindle 4 and in the path of the wheel axle 6 it is evident that as the spindle 4 is inclined the center of the wheel 7 would remain approximately the same distance from the ground and as the axle 6 was inclined the junction of the axle 6 with the spindle 4 would be raised or lowered and thereby raise or lower that end of the axle 1 depending on whether the wheel was turned toward or away from the vehicle.

But as the slots 3 are inclined or arranged spiral in opposite directions it is obvious that as the junction of the wheel axles 6 with the spindles 4 traverse said oppositely inclined spiral slots one junction will be raised and the other lowered an equal amount thereby retaining the axle 1 at a constant level or elevation.

In Fig. 5 of the drawings, which is illustrated as being vertical instead of inclined to simplify the drawings, we have illustrated a modified form of the invention wherein the inner end of the wheel axle 6 is threaded to engage a spirally threaded spindle 12 secured within an inclined yoke 14 formed on each end of the axle 1.

In this form the junction of the wheel axle 6 with the threaded spindle 12 is raised or lowered as the wheel is turned, the steering arm not shown in this figure, in this case being attached to the rear of the axle 6 as is sometimes the practice.

It is obvious from the foregoing that we have provided a new and useful improvement in a steering mechanism whereby the lateral thrust is partially offset and a greater lateral resistance is imparted to both wheels when turned as in steering.

Having thus described our invention what we claim as new and desire to secure by Letters Patent is—

1. A steering mechanism for vehicles comprising an axle having a sleeve on each end thereof; a wheel for each sleeve having its axis pivotally mounted within the sleeve said sleeve being inclined toward the rear of the vehicle whereby the wheels are inclined toward the direction in which they are being turned when steering; and means for raising the inner end of one wheel axis and lowering the inner end of the other wheel axis simultaneously when said wheels are turned when steering whereby the elevation of the axle may be retained.

2. A steering mechanism for vehicles comprising an axle having a rearwardly inclined sleeve on each end thereof; a wheel for each sleeve having its axis pivotally mounted within the sleeve whereby said wheels may be inclined toward the direction in which they are being turned when steering to offset the thrust occasioned by steering; means for raising the inner end of one wheel axis and for lowering the inner end of the other wheel axis simultaneously when steering; and means for turning both wheels in either direction a proportionate amount simultaneously.

3. A steering mechanism comprising an axle having a hollow rearwardly inclined sleeve on each end thereof, each sleeve being provided with an inclined spiral slot, the inclination of the slot in one sleeve being opposite to that of the slot in the other sleeve and of equal pitch; a spindle rotatably mounted within each sleeve; a lateral wheel axis secured to each spindle and extending through the slot in the sleeve; a wheel rotatably mounted upon each lateral axis; and means for turning both wheels simultaneously whereby said wheels may be inclined toward the direction in which they are turned to partially offset the lateral thrust occasioned by turning.

In witness whereof we hereunto set our signatures.

ELMER T. COX.
WILLIAM E. COX.

Copies of this patent may be obtained for five cents each, by addressing the "Commissioner of Patents, Washington, D. C."